United States Patent [19]

Zboralski et al.

[11] Patent Number: 4,609,553
[45] Date of Patent: Sep. 2, 1986

[54] METHOD OF PRODUCING SOFT CHEESE

[75] Inventors: Ullrich Zboralski, Offenbach-Buergel; Karlheinz Dorn, Budenheim, both of Fed. Rep. of Germany

[73] Assignee: Chemische Fabrik Budenheim, Rudolf A. Oetker, Budenheim, Fed. Rep. of Germany

[21] Appl. No.: 690,053

[22] Filed: Jan. 9, 1985

[30] Foreign Application Priority Data

May 19, 1984 [DE] Fed. Rep. of Germany ....... 3418792

[51] Int. Cl.$^4$ .................. A23C 19/064; A23C 19/076
[52] U.S. Cl. ....................................... 426/36; 426/582
[58] Field of Search ............................ 426/582, 36, 39

[56] References Cited

U.S. PATENT DOCUMENTS

| | | | |
|---|---|---|---|
| 2,564,374 | 8/1983 | Roland | 426/582 |
| 3,502,481 | 3/1970 | Schaap et al. | 426/582 |
| 4,390,560 | 6/1983 | Koide et al. | 426/582 |
| 4,397,926 | 8/1983 | Galal | 426/582 |

*Primary Examiner*—Jeanette Hunter
*Attorney, Agent, or Firm*—Schwartz, Jeffery, Schwaab, Mack, Blumenthal & Evans

[57] ABSTRACT

A process for producing soft cheese is disclosed wherein insoluble calcium phosphate having a CaO/P$_2$O$_5$ ratio from 2.5:1 to 3.1:1 is added to conventional smelt salts in amounts of between 0.3 and 1.6 percent, based on raw cheese and fat. The calcium phosphate has a beta-tricalcium phosphate content of from 50 to 100 percent and, preferably, a specific surface of from 20 to 80 m$^2$/g and an average grain size of from 1 to 20/$\mu$.

5 Claims, No Drawings

METHOD OF PRODUCING SOFT CHEESE

BACKGROUND OF THE INVENTION

So-called smelt salts based on phosphates and citrates have conventionally been used for the production of soft or process cheese. Such salts cause the known sol/gel transformation of the paracaseinate contained in the raw cheese with a stable emulsion of lactalbumin, milk fat and water being formed under the application of heat and mechanical agitation.

Such processes are supported, among other things, by transformation of the calcium paracaseinate into the soluble sodium salt through ion exchange with the smelt phosphates as used. In parallel thereto, a hydration takes place in which water is firmly integrated by electrostatic forces into the molecular bond of the peptide chain of the casein.

The extent to which calcium can be masked and, hence, protein can be dispersed depends on the smelt salt effect. In this manner, by suitable use of the smelt phosphates, hydration and viscosity increase of the melt can be controlled. If the effect of the phosphates is excessive, the peptide chains may be split into too short-linked aggregates, which, practically, can be equated with the state of over-creaming. That state will invariably occur if the hydration capacity of the paracasein is depleted and the colloidal "soft cheese" system become unstable. The soft cheese will then harden under the outflow of water to form a crumbly and cracky material.

Such emulsion disturbances, among other things, can also be caused by the presence of $Ca++$ ions that are not complexbonded as a result of unsuitable smelt salt combinations. Occasionally, raw cheeses also contain increased Ca contents which during smelting result in faulty products.

For this reason, hitherto, it has not been possible to use calcium-bearing salts in the production of soft cheese. From the point of view of the much-discussed Ca/P ratio in human food, for example, calcium phosphates would be a highly interesting product class. Even insoluble types such as dicalcium phosphate or commercially available tricalcium phosphate having a $CaO/P_2O_5$ ratio of 3.15–3.40:1 are soluble to a certain extent and cause emulsion disturbances. Also, these calcium phosphates, in the weakly acid range, solubilize additional $Ca++$ ions. Process cheese normally is molten in a weakly acid pH range of between 5.5–6.0. However, that pH range is already sufficient to split off active $Ca++$ ions from the prior known and commercially available Ca-phosphates, resulting after a short storage time in a denaturation of the casein, combined with a hard and cracky consistency. Moreover, point-shaped, white metabolites are formed together with a "sandy" consistency of the soft cheese. In that state, the process cheese can be considered to be a faulty product which is unmarketable.

SUMMARY OF THE INVENTION

Surprisingly, it has now been found that, when using a specifically saturated tricalcium phosphate tempered at high temperatures, even after extended storage, no $Ca++$ precipitation will take place and that such products will have a positive influence on the properties of special types of soft cheese which could not have been predicted. Of special advantage are products having a $CaO/P_2O_5$ ratio of between 2.5 and 3.1:1 and exhibiting more or less high proportions of beta-tricalcium phosphate in radiological analysis (x-ray crystallography). Such products improve the creaminess and gloss of soft cheeses produced therefrom. Moreover, they cause a marked brightening of the cheese material combined with a rounded or moderated flavor which is especially desired when processing raw cheeses aged to a higher degree. For example, with soft cheeses having fat levels between 20 and 45 percent fat (dry), a considerably improved spreadability and softness can be attained. Particularly with soft cheeses having lower fat levels, which in the majority of cases are slightly rolly and tough, these advantages must be considered a marked technical advance.

DETAILED DESCRIPTION OF PREFERRED EMBODIMENTS

It is understood that in the smelting process substantially insoluble calcium phosphates develop their effect only jointly with the standard, soluble smelt salts, which can be added in a relatively broad dose range. The above-indicated improvements can be attained with an added insoluble calcium phosphate dose of only 0.3 percent, calculated with respect to raw cheese and fat. However, optimum effects will be attained at dosages of 0.4 to 1.6 percent, calculated with respect to raw cheese and fat.

The grain size and the specific surface of these Ca-phosphates affect their action on the soft cheese. The products are required to be so finely divided that the taste of the soft cheese is not affected thereby. Further, the consistency improving properties of these Ca-phosphates are determined by the size of the specific surface.

Soft cheese tests have shown that products having an average grain size of between 1 and $20\mu$ over a specific surface of between 20 and 80 $m^2/g$ produce the best results. The effect of the described Ca-phosphates on soft cheese is specific and not attainable with commercially available di- and tricalcium phosphates.

As noted above, in the manufacture of soft cheeses, among other things, an enrichment in Ca-salts is of interest with respect to nutritional physiology. In processing Ca-phosphates in soft cheese in accordance with the invention, an interesting Ca-enrichment arises that contributes in part to improving the existing Ca/P-ratio.

The following examples demonstrate the unexpected advantages obtained by using the described Ca-phosphates.

EXAMPLE 1

The soft cheese recipe corresponded to a product having 20 percent fat in dry solids and 33 percent dry solids content.

The following ingredients were molten using 12.8 kg water/vapor:
- 30 kg Chester (50 percent fat in dry solids)
- 30 kg cottage cheese
- 9 kg whey powder containing:
  - 1.2 kg trisodium pyrophosphate
  - 0.4 kg sodium tetrapolyphosphate The resulting soft cheese in its chewing and spreading properties correspond to a normal soft cheese quality, i.e., the resultant soft cheese, in its consistency, had to be judged to be tough and rolly.

EXAMPLE 2

With otherwise identical test parameters, 0.25 kg of a tricalcium phosphate having a $CaO/P_2O_5$ ratio of 2.90:1 and a beta-tricalcium phosphate content of 90 percent were added along with the smelt salt to the ingredients listed in Example 1. The tricalcium phosphate had an average grain size of $2.5\mu$ and a specific surface of 52 $m^2/g$.

The resulting soft cheese clearly was softer to chew, significantly more spreadable, and lighter in color and its flavor was rounded off (moderated) better than the cheese produced according to Example 1.

EXAMPLE 3

The test described in Example 1 was repeated except that 0.5 kg of a tricalcium phosphate having a $CaO/P_2O_5$ ratio of 2.65:1 and a beta-tricalcium phosphate content of 60 percent were added along with the smelt salt. The average grain size of the tricalcium phosphate was $6\mu$, and the specific surface was 28 $m^2/g$.

The resulting soft cheese clearly was softer to chew, more spreadable, and lighter in color than the cheese obtained according to Example 1.

EXAMPLE 4

The soft cheese recipe corresponded to a product having 45 percent fat in the dry solids and 43 percent dry solids content.

The following ingredients were molten using 35.6 kg water/vapor:

50 kg Chester (50 percent fat in dry solids)
30 kg Gouda (55 percent fat in dry solids)
1.2 kg whey powder containing:
　1.0 kg sodium tripolyphosphate
　1.2 kg sodium tetrapolyphosphate The resulting soft cheese corresponded to a standard soft cheese quality in spreadability and flavor.

EXAMPLE 5

Example 4 was repeated except that 0.5 kg of a tricalcium phosphate having a $CaO/P_2O_5$ ratio of 2.80:1 and a beta-tricalcium phosphate content of 85 percent were added along with the smelt salt. The average grain size was $1.30\mu$, and the specific surface was 73 $m^2/g$.

The resulting soft cheese was clearly more spreadable, tenderer in taste and lighter in color, and the cheese gloss was more attractive.

EXAMPLE 6

The test of Example 4 was repeated except that 1.2 kg of a tricalcium phosphate having a $CaO/P_2O_5$ ratio of 2.92:1 and a beta-tricalcium phosphate content of 95 percent were added along with the smelt salt. The average grain size of the tricalcium phosphate was $12\mu$, and the specific surface was 20 $m^2/g$.

The resulting soft cheese, as compared with the cheese manufactured according to Example 4, was more spreadable, softer and rounded off (moderated) better in taste, lighter in color and had a more attractive gloss.

The foregoing examples clearly show that in the production of soft cheese, marked quality improvements can be attained if special tricalcium phosphates are added along with the standard smelt salts, which tricalcium phosphates are characterized in that the $CaO/P_2O_5$ ratio thereof is between 2.5 and 3.1:1 and the respective beta-tricalcium phosphate content thereof is between 50 and 100 percent.

The foregoing description has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A method of producing soft cheese by treating cheese with smelt salt wherein the smelt salt comprises an insoluble calcium phosphate having a $CaO/P_2O_5$ ratio from 2.5:1 to 3.1:1 and a beta-tricalcium phosphate content from 50 to 100 percent.

2. A method of producing soft cheese according to claim 1 wherein said calcium phosphate is added to the cheese to be treated in an amount from 0.3 to 1.6 percent by weight based on raw cheese and fat.

3. A method of producing soft cheese according to claim 2 wherein said calcium phosphate is added to the cheese to be treated in an amount from 0.4 to 1.6 percent based on raw cheese and fat.

4. A method of producing soft cheese according to claim 1 wherein said calcium phosphate has an average grain size from 1 to 20 microns.

5. A method of producing soft cheese according to claim 1 wherein said calcium phosphate has a specific surface from 20 to 80 $m^2/g$.

* * * * *